United States Patent [19]

Nagano

[11] Patent Number: 4,725,506
[45] Date of Patent: Feb. 16, 1988

[54] CHLORINATED POLYOLEFINS

[75] Inventor: Riichiro Nagano, Hatsukaichi, Japan

[73] Assignee: Mitsui Petrochemical Industries, Ltd., Tokyo, Japan

[21] Appl. No.: 913,676

[22] PCT Filed: Jan. 16, 1986

[86] PCT No: PCT/JP86/00014
§ 371 Date: Sep. 12, 1986
§ 102(e) Date: Sep. 12, 1986

[87] PCT Pub No.: WO86/04339
PCT Pub Date: Jul. 31, 1986

[30] Foreign Application Priority Data

Jan. 17, 1985 [JP] Japan .................................. 60-4921

[51] Int. Cl.$^4$ ............................................. B32B 27/08
[52] U.S. Cl. .................................... 428/516; 428/412; 428/483; 428/518; 525/334.1
[58] Field of Search ............... 428/518, 516, 520, 412, 428/483; 525/334.1

[56] References Cited

U.S. PATENT DOCUMENTS

| 3,398,046 | 8/1968 | Fowler et al. | 525/334.1 |
| 3,874,987 | 4/1975 | Young | 428/518 |
| 4,376,799 | 3/1983 | Tusim | 428/518 |
| 4,547,554 | 10/1985 | Kadomatsu | 525/334.1 |
| 4,612,252 | 9/1986 | Sagane | 428/518 |
| 4,677,166 | 6/1987 | Ozaki et al. | 525/334.1 |

Primary Examiner—Edith Buffalow
Attorney, Agent, or Firm—Sherman and Shalloway

[57] ABSTRACT

A chlorinated polyolefin having a chlorine content of 15 to 30% by weight which is produced by chlorinating a polyolefin type polymer comprising propylene units and units of an α-olefin having 4 to 6 carbon atoms in a particular ratio and having a crystallinity of 10 to 50% and an intrinsic viscosity of 0.8 to 6.0 dl/g. This chlorinated polyolefin can be used as an adhesive for lamination of a chlorine-containing polymer (e.g. a polyvinylidene chloride) and an aromatic polymer (e.g. a polystyrene) and exhibits excellent adhesion characteristics at high temperature atmospheres.

7 Claims, No Drawings

CHLORINATED POLYOLEFINS

TECHNICAL FIELD

This invention relates to novel chlorinated polyolefins. More particularly, the present invention relates to adhesives which can exhibit excellent adhesion characteristics even in high temperature atmospheres in laminating a chlorine-containing polymer or an aromatic polymer and a polyolefin.

BACKGROUND ART

Chlorine-containing polymers [e.g. polyvinyl chloride (PVC), polyvinylidene chloride (PVDC)] and aromatic polymers (e.g. polyesters, polycarbonates, polystyrenes, polyphenylene oxides) are widely used in applications such as food containers, packaging materials, daily sundries, automotive interior trim parts, building materials, industrial materials and the like.

In some of these applications which require such properties as chemicals resistance, water resistance, hot-water resistance and gas barrier property, lamination of said chlorine-containing polymer or said aromatic polymer and a polyolefin (e.g. polyethylene, polypropylene) has been tried in order to allow the chlorine-containing polymer or the aromatic polymer to have said properties. However, no adhesive having excellent adhesion characteristics at high temperature has been developed yet. For instance, when an epoxy groupcontaining polyolefin known as a conventional adhesive polyolefin is used as an adhesive for lamination of a polyolefin and an aromatic polymer, no excellent adhesion characteristics can be obtained. Further, in direct lamination of an aromatic polymer and said modified polyolefin, no excellent adhesion characteristics can be obtained, either.

On the other hand, it is well known to use chlorinated polyethylene as an adhesive for adhered polymers mentioned above.

Japanese Patent Publication No. 18891/62 discloses a method wherein in bonding a film or sheet of a halogenated vinyl or vinylidene polymer to a polyolefin film or sheet, the back side of the polyolefin film or sheet is halogenated and the two films or sheets are directly melt-bonded.

Japanese Patent Publication No. 27236/70 discloses a method wherein a chlorinated ethylene polymer having a chlorine content of 33 to 55% by weight, an oxygen content of 0 to 3.0% by weight, a crystallinity of 1% or lower and an inherent viscosity of 0.2 to 1.8 is used as an adhesive for plasticized vinyl chloride polymers.

Japanese Patent Publication No. 47292/72 discloses a hot-melt adhesive consisting of 100 parts by weight of essentially amorphous chlorinated polyethylene containing 30 to 65% by weight of chlorine and obtained by chlorinating high density polyethylene at a temperature of 100° C. or higher, and 0.5 to 5 parts by weight of an organic peroxide.

Japanese Patent Publication No. 41677/76 (corresponding to U.S. Pat. Nos. 3532795 and 3549389) describes a method wherein a polyolefin layer and a barrier layer, the main portion of which is composed of vinylidene chloride, are bonded with one of several adhesives including chlorinated polyethylene to produce a packaging film.

Japanese Laid-Open Patent Publication No. 81379/81 proposes chlorinated polyethylene having a chlorine content of 10 to 50% by weight and a polymer composition composed mainly of said chlorinated polyethylene, for use as an adhesive for bonding of a polyvinyl chloride mixture and a polyethylene.

Japanese Patent Publication No. 1710/83 discloses a resin composition comprising 100 parts by weight of a carboxyl-modified ethylene/vinyl acetate copolymer and 10 to 300 parts by weight of chlorinated polyethylene, for use as an adhesive for bonding a polyester resin to itself or to an other substrate.

Thus, the above prior art references describe that chlorinated polyethylene can be used as an adhesive singly or in combination with an other component. The chlorinated polyethylenes used in the prior art contain chlorine in an amount of at least 10% and, in some cases, as high as 60% in order to reduce the crystallinity of polyethylene and to impart adhesive property to the polyethylene. For instance, in Japanese Laid-Open Patent Publication No. 81379/81 mentioned above, there is used, as an adhesive, a chlorinated polyethylene obtained by chlorinating polyethylene to chlorine contents of 10 to 60% by weight. However, chlorine contents of 10 to 20% by weight can not provide sufficient adhesion strength. In contrast, chlorine contents above 20% by weight can not provide sufficient adhesion characteristics at high temperature even if it can provide sufficient adhesion characteristics at normal temperature.

Japanese Patent Publication No. 35091/75 discloses a coating composition for a molded article of polypropylene, which contains, as a main active component, a chlorinated, amorphous propylene/ethylene copolymer obtained by chlorinating an amorphous propylene-/ethylene copolymer having an ethylene content of 2 to 30% by weight (about 3.1 to 39 mole%), being substantially free from any solvent and having an $[\eta]$ of 0.3 to 1.5, to a chlorine content of 5 to 35%. This chlorinated propylene/ethylene copolymer includes those having a relatively low chlorine content but requires, in its production, the use of an amorphous propylene/ethylene copolymer as a starting material.

Such a chlorinated, amorphous propylene/ethylene copolymer has insufficient adhesion characteristics at high temperature.

Japanese Patent Publication No. 37688/75 discloses an adhesive for molded articles of polyolefin, which is mainly composed of a chlorinated propylene/ethylene copolymer obtained by chlorinating a propylene/ethylene copolymer having an ethylene content of 2 to 15% by weight (about 3.1 to 21.0 mole%). It is described in the publication that the chlorinated propylene/ethylene copolymer has a chlorination degree of 20 to 40% by weight, preferably 22 to 35% by weight. Further, it is taught in the publication that, when the chlorination degree is lower than said range, the chlorinated propylene/ethylene copolymer has poor workability and, upon being left standing, gels and becomes unusable as it is and, when the chlorination degree is high than said range, the chlorinated propylene/ethylene copolymer has reduced adhesion strength and therefore is practically valueless as an adhesive.

In said Japanese Patent Publiction No. 37688/75, the chlorinated propylene/ethylene copolymer is dissolved in a solvent such as toluene and the resulting solution is used as a heat-sealing agent for polyolefin films. The publication makes no mention of whether or not the chlorinated propylene/ethylene copolymer has adhesion to chlorine-containing polymers or aromatic polymers, or of the crystallinity and molecular weight distribution of the copolymer used as a starting material in the chlorination reaction. Thus, the chlorinated propylene/ethylene copolymer of Japanese Patent Publication No. 37688/75 is characterized by its excellent workability (uniform dissolution in solvents) as compared with chlorinated isotactic polypropylenes, in spite of its low chlorine content. From this matter, it is apparent that the propylene/ethylene copolymer used in the invention of Japanese Patent Publication No. 37688/75 is an amorphous propylene/ethylene copolymer. As mentioned previously, the chlorination product of such an amorphous propylene/ethylene copolymer is inferior in heat resist- ance.

Japanese Laid-Open Patent Publication No. 133081/85 (corresponding to European Patent Application No. 149356) discloses an adhesive for chlorine-containing polymers or aromatic polymers, which is a chlorination product of a polyolefin (A) having a crystallinity of 50% or below and has a chlorine content of 0.1 to 10% by weight.

Japanese Laid-Open Patent Publication No. 8643/72 (corresponding to UK Patent No. 1373805) describes an invention relating to a halogenation process for polyolefins. It is disclosed in Example 2 that a propylene/butene copolymer having a Y-Red-value of 0.47 and a melt viscosity of 43,000 cp at 190° C. and containing less than 0.1% of heptane-insoluble component was dissolved in $CCL_4$ and chlorinated with chlorine gas to obtain a polymer having a chlorine content of 67.0%.

Japanese Patent Publication No. 33663/75 (corresponding to UK Patent No. 1285836) discloses an invention relating to an electrophotographic element obtained by coating an electroconductive substrate with a photoconductive composition consisting of a nonpolymeric organic photoconductive substance and a halogenated poly($\alpha$-olefin) binder. Example 8 uses, as the binder, a chlorinated propylene/butylene copolymer (propylene: 50%) having a chlorine content of about 60% by weight.

Hence, an object of the present invention is to provide a novel chlorinated polyolefin.

Another object of the present invention is to provide an adhesive containing the chlorinated polyolefin of the present invention as an adhesive component.

Still another object of the present invention is to provide an adhesive which exhibits excellent adhesion characteristics for chlorine-containing polymers or aromatic polymers even in high temperature atmospheres.

A further object of the present invention is to provide a laminate of a chlorine-containing polymer or an aromatic polymer bonded with the adhesive of the present invention.

Other objects and advantages of the present invention will become apparent from the following description.

DISCLOSURE OF THE INVENTION

The above-mentioned objects and advantages of the present invention are firstly achieved by a chlorinated polyolefin, which is characterized by being produced by chlorinating a polyolefin having the following characteristics (a), (b), (c) and (d):

(a) comprising propylene units and units of an $\alpha$-olefin having 4 to 6 carbon atoms,
(b) comprising said propylene units and said $\alpha$-olefin units in amounts of 60 to 80 mole% and 40 to 20 mole%, respectively, based on the total amount of the propylene units and the $\alpha$-olefin units,
(c) having a crystallinity of 10 to 50%, and
(d) having an intrinsic viscosity of 0.8 to 6.0 dl/g, and is further characterized by
(e) having a chlorine content of 15 to 35% by weight.

The present invention will be described in detail below.

[Description of olefin polymer]

The olefin polymer used in the present invention [hereinafter referred to as the olefin polymer (A)] has the characteristics (a), (b), (c) and (d) all mentioned above.

The olefin polymer (A) comprises propylene units and units of an $\alpha$-olefin of 4 to 6 carbon atoms. As the $\alpha$-olefin of 4 to 6 carbon atoms, there can be mentioned, for example, 1-butene, 1-pentene, 4-methyl-1-pentene, 3-methyl-1-pentene, 1-hexene, etc. There $\alpha$-olefins can be used singly or in combination of two or more.

The olefin polymer (A) comprises the propylene units in an amount of 60 to 80 mole% and the units of an $\alpha$-olefin of 4 to 6 carbon atoms in an amount of 40 to 20 mole%, preferably 35 to 25 mole%, based on the total amount of the propylene units and the $\alpha$-olefin units.

The olefin polymer (A) may further comprise units derived from an other polymerizable component. As the other polymerizable component, there can be mentioned, for example, conjugated dienes suchd as butadiene, isoprene and the like; non-conjugated dienes such as 1,4-hexadiene, 1,7-octadiene, dicyclopentadiene, 5-ethylidene-2-norbornene, 5-vinyl-2-norbornene, 5-methylene-2-norbornene, 2,5-norbornadiene and the like; polar vinyl monomers such as (meth)acrylic acid, (meth)acrylic acid salts, (meth)acrylic acid esters, vinyl acetate, vinyl alcohol, 1-undecylenic acid, 1-undecenol, maleic anhydride and the like; ethylene; aromatic vinyl monomers such as styrene, vinyltoluene, $\alpha$-methylstyrene, indene and the like; and so forth.

Of these, polymerizable unsaturated compounds such as acrylic acid, methacrylic acid and maleic anhydride may be graft-copolymerized.

When the olefin polymer (A) contains the conjugated diene units or the non-conjugated diene units as components copolymerized with the $\alpha$-olefins, their content is preferably 3 mole% or less, more preferably 0.3 mole% or less.

When the polar vinyl monomer, ethylene or the aromatic vinyl monomer are used as the other component to be copolymerized, their content is preferably 20 mole% or less, more preferably 10 mole% or less.

Specific examples of the olefin polymer (A) include a propylene/butene copolymer, a propylene/4-methyl-1-pentene copolymer, a propylene/3-methyl-1-pentene copolymer, a propylene/1-butene/1-undecylenic acid copolymer, a propylene/4-methyl-1-pentene/1-undecylenic acid copolymer, a propylene/1-butene/1-undecenol copolymer, a propylene/4-methyl-1-pentene/1-undecenol copolymer, a propylene/1-butene/styrene copolymer, a propylene/3-methyl-1-butene/styrene copolymer, a propylene/4-methyl-1-pentene/styrene copolymer, a propylene/3-methyl-1-pentene/styrene copolymer, etc. Of these, the propylene/1-butene copolymer is preferable.

These olefin polymers (A) can be produced according to conventionally well known processes, for example, a process wherein propylene and the above mentioned $\alpha$-olefin are copolymerized using a vanadium catalyst or a titanium catalyst composed of magnesium, titanium, halogen, etc.

The olefin polymer (A) used in the present invention has a crystallinity of 10 to 50%. A crystalline polyolefin having a crystallinity of 10 to 40% is used preferably.

The olefin polymer (A) has an intrinsic viscosity [η] of 0.8 to 6.0 dl/g as measured in decalin at 135° C. The intrinsic viscosity is preferably 1.0 to 5.0 dl/g.

The olefin polymer (A) used in the present invention further has a molecular weight distribution ($\overline{Mw}/\overline{Mn}$ measured according to the GPC) usually of 1 to 20, particularly preferably of 1 to 15.

The chlorinated olefin polymer of the present invention can be obtained by chlorinating the olefin polymer (A). It has a chlorine content of 15 to 35% by weight, preferably 18 to 33% by weight.

The chlorination product of the olefin polymer (A) can be produced according to the following processes. For example, a process wherein an olefin polymer (A) is ground into fine particles and these fine particles are contacted, as an aqueous suspension, with molecular chlorine at about 70° to 90° C.; a process wherein an olefin polymer (A) is dissolved in a solvent stable to chlorine, such as carbon tetrachloride, tetrachloroethylene, chlorobenzene or the like and, in this uniform solution state, is contacted with molecular chlorine; and a process wherein an olefin polymer (A) is kneaded together with a chlorine compound such as N-chloroacetamide, N-chlorosuccinimide, 1,3-dichloro-5,5-dimethylhydantoin or the like by means of a roll or a Banbury mixer to obtain a uniform mixture and then the uniform mixture is heated at a temperature at which chlorine in the chlorine compound is liberated. Of these processes, the chlorination in an aqueous suspension state or a solution state is particularly preferable. The halogenation in a solution state is preferably conducted in the presence of a radical polymerization initiator or under exposure to ultraviolet light or visible light, because such a reaction condition allows the reaction to proceed efficiently. The degree of the chlorination can be controlled by appropriately selecting the use amount of molecular chlorine or an other chlorinating agent, the reaction time, the reaction temperature, etc.

The chlorinated polyolefin of the present invention has, in many cases, a crystallinity of about 45% or lower. Preferably the polymer is provided so as to have a crystallinity of 10 to 30%. Further, the chlorinated polyolefin of the present invention has almost same intrinsic viscosity as the olefin polymer (A) from which said chlorinated polyolefin is produced by chlorination. The chlorinated polyolefin is advantageously provided so as to have an intrinsic viscosity of 1.0 to 5.0 dl/g.

The adhesive of the present invention comprises the chlorinated polyolefin. It can consist of, for example, only the chlorinated polyolefin of the present invention, or may be a composition obtained by incorporating into said chlorinated polyolefin another polymer component and various additives (e.g. an antioxidant, a ultraviolet absorber, a hydrochloric acid capture, an inhibitor for hydrochloric acid generation, a plasticizer, a pigment, a dye, a filler, a nucleating agent, an anti-blocking agent, a slip agent, an antistatic agent, a flame retardant) in amounts which do not impair the adhesion characteristics of the chlorinated polyolefin.

As the other polymer to be incorporated into the chlorinated polyolefin, there can be mentioned, for example, the olefin polymer (A) and rubber components such as an ethylene/α-olefin copolymer rubber, an ethylene/α-olefin/diene copolymer rubber, polyisobutylene, a butyl rubber, a styrene/butadiene copolymer rubber, a nitrile rubber, a silicone rubber and the like.

As the antioxidant, there can be mentioned, for example, 2,6-di-tert-butyl-p-cresol, o-tert-butyl-p-cresol, tetrakis-[methylene-3-(3,5-di-tert-butyl-4-hydroxyphenyl)-propionate]methane, β-naphthylamine and p-phenylenediamine.

As the ultraviolet absorber, there can be mentioned, for example, 2,4-hydroxybenzophenone, 2-(2'-dihydroxy-3, 5'-di-tert-butylphenyl)-5-chlorobenzo-triazole, 2-(2-hydroxy-3-tert-butyl-5-methylphenyl) 5-chlorobenzotriazole and bis(2,2',6,6'-tetramethyl-4-piperidine) sebacate.

As the absorbent for generated hydrochloric acid and the inhibitor for hydrochloric acid generation, there can be mentioned, for example, epoxidized soybean oil, metal salts of saturated and unsaturated higher fatty acids such as stearic acid and the like, dibutyltin maleate, tribromophosphate, tetrasodium pyrophosphate, 4'-tert-butylphenyl salicylate, disodium o-phosphate and pyrophosphates, o-phosphates and phosphites of alkali metals.

As the plasticizer, there can be mentioned, for example, methyl phthalyl ethyl glycolate, ethyl phthalyl ethyl glycolate, 3-(2-xenoxy)-1,2-epoxypropane, di(α-phenylethyl) ether, alkyl phthalates (e.g. dibutyl phthalate, dioctyl phthalate) and esters of adipic acid and sebacic acid.

The adhesive of the present invention containing the chlorinated polyolefin of the present invention can be used for adhesion between chlorine-containing polymers, between aromatic polymers, or between a chlorine-containing polymer and an aromatic polymer. However the adhesive can preferably be used for adhesion between a chlorine-containing polymer and a polyolefin or between an aromatic polymer and a polyolefin. As the chlorine-containing polymer, there can be mentioned, for example, polyvinylidene chloride, polyvinyl chloride, a vinylidene chloride/vinyl chloride copolymer, a copolymer of vinylidene chloride or vinyl chloride and other unsaturated monomer, copolymers composed essentially of a chlorinated vinyl monomer (e.g. polyvinyl chloride having grafted thereto a polar monomer such as vinyl acetate or the like), chlorine-containing rubbers (e.g. polychloroprene), chlorinated polymers (e.g. chlorinated polyethylene, chlorinated polypropylene, chlorinated polystyrene) and copolymers grafted with a chlorinated vinyl monomer (e.g. a polygrafted with vinylidene chloride and/or vinyl chloride). It is preferable that the adhesive of the present invention be applied particularly to polyvinylidene chloride, polyvinyl chloride, vinylidene chloride/vinyl chloride copolymer, polyvinyl chloride having a polar monomer grafted.

As the aromatic polymer, there can be mentioned, for example, styrene resins such as polystyrene, poly(α-methyl styrene), a styrene/acrylonitrile copolymer (AS), a styrene/acrylonitrile/butadiene copolymer (ABS) and the like; aromatic polycarbonates such as a polycarbonate of bisphenol A, a polycarbonate of bisphenol F, a polycarbonate of bisphenol AD and the like; polyphenylene oxides such as polyphenylene oxide, modified polyphenylene oxide, grafted polyphenylene oxide and the like; and aromatic polyesters such as polyethylene terephthalate, polybutylene terephthalate, polyethylene terephthalate isophthalate, polycyclohexylene ethylene terephthalate, polyethylene 2,6-naphthaleindicarboxylate, polyphenylene terephthalate, a bisphenol A/terephthalic acid copolymer, a bisphenol A/terephthalic acid/isophthalic acid copolycondensate and the like. The above mentioned polymers to which the adhesive of the present invention can be applied can take any form, i.e., various shaped articles, a bottle, a tube, a sheet, a film, etc. Further, they can be foamed or non-foamed.

The adhesive of the present invention can be applied in a melt form or a solution form wherein the adhesive is dissolved in a solvent. The application in a melt form is desirable.

When a laminate of the chlorine-containing polymer or the aromatic polymer and a polyolefin is formed using the adhesive of the present invention, the formation of the laminate can be conducted according to, for example, a T-die multilayer sheet or film formation method wherein three different polymers which are to constitute each layer of a laminate to be prepared are separately supplied to three extruders and the resulting molten polymers are bonded in a die, or a tandem method wherein molten polymers are heat-bonded outside a die. In this case, the thickness of the polyolefin layer can be optional but is ordinarily 5 μm to 50 mm and preferably 10 μm to 40 mm. The adhesive of the present invention forms an intermediate adhesive layer, and its thickness can be optional but is ordinarily 1 to 500 μ and preferably 2 to 100 μ. In a similar manner, there can be prepared various laminates of 3 layers of 2 kinds, 3 layers of 3 kinds, 4 layers of 3 kinds, 4 layers of 4 kinds, 5 layers of 3 kinds, 5 layers of 4 kinds, 5 layers of 5 kinds and 6 or more layers.

EXAMPLES

The properties of the chlorinated polyolefins and the olefin polymers as a raw material, all used in the Examples were measured as follows.

(1) Chlorine content

About 10 mg of a chlorinated polyolefin was subjected to complete combustion in an oxygen flask and the resulting chlorine portion was absorbed by water in the form of hydrogen chloride. To this aqueous hydrogen chloride solution was added silver nitrate. The resulting silver chloride precipitate was recovered and subjected to fluorescent X-ray spectrometry, whereby the chlorine content (wt.%) in the chlorinated polyolefin (B) was determined.

(2) [η]

This was measured in a decalin solvent at 135° C.

(3) Crystallinity

The crystallinity of a polyolefin to be chlorinated was measured according to the following method.

(i) Preparation of test sample

A polyolefin was left standing in a hot press molding machine heated at 200° C., for 6 minutes at a pressure of 50 kg/cm² and then was quenched by a cold press of room temperature, whereby a sheet of 1 mm in thickness was prepared.

(ii) Measurement by X-ray diffraction method

The above prepared test sample was subjected to measurement by an X-ray diffraction apparatus (RU-200-PL, manufactured by Rigaku Denki Sha) at 23° C. The crystallinity of the test sample was calculated from the following formula.

$$\text{Crystallinity} = \frac{Acr}{Aam \pm Acr} \times 100$$

Where
Acr = Diffraction intensity (area) of a crystalline portion
Aam = Diffraction intensity (area) of an amorphous portion The crystallinity of a chlorinated polyolefin was measured in the same manner as in the above steps (i) and (ii) except that, in the above step (i), the temperature of the hot press molding machine was changed from 200° C. to 100° C.

(4) Molecular weight distribution ($\overline{Mw}/\overline{Mn}$)

The weight average molecular weight ($\overline{Mw}$) and number average molecular weight ($\overline{Mn}$) of a sample were measured according to gel permeation chromatography under conditions of o-dichlorobenzene (solvent) and 135° C. Then, $\overline{Mw}/\overline{Mn}$ was calculated.

EXAMPLE 1

1000g of a propylene/1-butene copolymer having an [η]of 1.7 dl/g, a propylene unit content of 70 mole%, a crystallinity of 25% and $\overline{Mw}/\overline{Mn}$ of 4.9 was dissolved in 10 liters of carbon tetrachloride at 70° C. in a nitrogen atmosphere in a glass flask. While the resulting polymer solution was stirred at 300 rpm at 70° C. under a light-shielding condition, chlorine gas was blown into the polymer solution for 4 hours to conduct a reaction. In the reaction, a solution of benzoyl peroxide dissolved in chlorobenzene was added dropwise using a dropping funnel over 3 hours (the first 3 hours of the total reaction time). The reaction was terminated by adding 800 ml of a 2 N aqueous sodium hydroxide solution. The reaction mixture was washed with a hot water of 40° C. Then, a large amount of methanol was added to the reaction mixture to precipitate a polymer. The polymer precipitate was collected by filtration. The precipitate was washed repeatedly with methanol and vacuum-dried at 40° C. in a nitrogen atmosphere to obtain a chlorinated propylene/1-butene copolymer. This chlorination product had a chlorine content of 25% by weight.

To 100 parts of the chlorinated propylene/1-butene copolymer were added 0.5 part of dibutyltin maleate and 0.5 part of epoxidized soybean oil to prepare a mixture. The mixture was melted by an extruder and supplied to a die for a T-die three-layer composite sheet formation, at a resin temperature of 180° C. Separately, polypropylene having a [η]of 2.8 dl/g and polyvinylidene chloride (trade name: SARAN, X05253-16, manufactured by Dow Chemical Co.) were melted by two other extruders and supplied to the same die at resin temperatures of 200° C. and 180° C., respectively. Thus, there was prepared a three-layered sheet consisting of a polypropylene layer (outer layer) of 200 μ, a chlorinated propylene/1-butene copolymer layer (intermediate layer) of 20 μ and a polyvinylidene chloride layer (inner layer) of 200 μ.

A test piece of 10 mm in width was cut off from the three-layer sheet prepared above. The peeling strength between the polyvinylidene chloride and the chlorinated propylene/1-butene copolymer was measured by first effecting peeling partly between the polyvinylidene and the chlorinated propylene/1-butene copolymer, and then continuing the peeling by pulling the two-layer film of polypropylene and the chlorinated propylene/1-butene copolymer at 90°.

The above measurement of peeling strength was conducted at atmospheric temperatures of 23° C. and 80° C. The results are shown in Table 1.

EXAMPLE 2

A laminate was prepared in the same manner as in Example 1 except that there was used, as the adhesive layer (intermediate layer), a 8:2 mixture of the chlorinated, propylene/1-butene copolymer prepared in Example 1 and a polypropylene having an [μ] of 3.0 dl/g (the mixture further contained 0.25 parts of epoxidized soybean oil and 0.25 part of dibutyltin maleate based on 100 parts of the composition). The peeling strengths of this laminate at 23° C. and 80° C. are shown in Table 1.

EXAMPLES 3 AND 4

Laminates were prepared in the same manner as in Example 1 except that there were used, as the adhesive layers, chlorinated, ethylene/propylene copolymers prepared in accordance with chlorination methods similar to that of Example 1 (copolymers had, before chlorination, an ethylene content of 80 mole%, an [μ] of 1.3 dl/g, a crystallinity of 15% and a $\overline{Mw}/\overline{Mn}$ of 3.2 and, after chlorination, chlorine contents of 5 and 20% by weight, respectively). For each laminate, the peeling stength between the polyvinylidene chloride and the adhesive layer was measured. The results are shown in Table 1.

As is obvious from Examples 3 and 4, the chlorination products of ethylene-based polymers give small peeling strengths in high temperature atmospheres and accordingly are not suitable for use in applications such as retort food containers requiring heat resistance.

EXAMPLES 5 AND 6

Laminates were prepared in the same manner as in Example 1 except that there were used, as the adhesives, chlorination products of the propylene/1-butene copolymer used in Example 1, having chlorine contents of 7 and 39% by weight, respectively. For each laminate, the peeling strengths between the layers were measured. The results are shown in Table 1.

EXAMPLES 7 TO 9

Laminates were prepared in the same manner as in Example 1 except that there were used, as the adhesive layers, the chlorination products each having a chlorine content of about 20% by weight which were prepared from the propylene-based (co)polymers shown in Table 1. For each laminate, the peeling strengths between the layers were measured. The results are shown in Table 1.

EXAMPLES 10 AND 11

Laminates were prepared in the same manner as in Example 1 except that there were used, as the adhesive layers, the chlorination products prepared from the propylene/1-butene copolymers each having a different [μ] or a molecular weight distribution as shown in Table 1. For each laminate, the peeling strengths between the layers were measured. The results are shown in Table 1.

EXAMPLE 12

A laminate consisting of a polyvinyl chloride, a chlorinated, propylene/1-butene copolymer and a polypropylene was prepared in the same manner as in Example 1 except that a polyvinyl chloride was used as a chlorine-containing polymer in place of the polyvinylidene chloride used in Example 1.

The peeling strength between the polyvinylidene chloride and the chlorinated propylene/1-butene copolymer was measured. The results are shown in Table 1.

EXAMPLES 13 AND 14

Laminates each of 3 layers of 3 kinds were prepared in the same manner as in Example 1 except that (1) for the chlorinated polyolefin as an adhesive layer, there was used a chlorination product of a maleic anhydride-grafted polymer (maleic anhydride content: 0.3% by weight) obtained by grafting maleic anhydride to the propylene/1-butene copolymer used in Example 1, or a composition consisting of 80 parts by weight of the chlorinated, propylene/1-butene copolymer prepared in Example 1, 15 parts by weight of a polypropylene and 5 parts by weight of a maleic anhydride-grafted polypropylene (maleic anhydride content: 3.0% by weight), (2) for the polymer as a base material layer (outer layer), there was used, in place of the polypropylene, an ethylene/vinyl alcohol copolymer (EVOH, ethylene content: 35 mole%), and (3) for the polymer as a chlorine-containing polymer base material layer (inner layer), there was used a polyvinylidene chloride (PVDC) in place of the polyvinyl chloride (PVC).

In Table 2, there are shown the peeling strenghs between the PVC layer and the carboxylic group-containing chlorinated polyolefin layer, as well as the peeling strengths between the EVOH layer and the carboxylic group-containing chlorinated polyolefin layer.

EXAMPLES 15 AND 18

Laminates were prepared in the same manner as in Example 1 except that there were used, as the inner layer polymers, the aromatic polymers shown in Table 2, in place of the polyvinylidene chloride used in Example 1. For each laminate, the peeling strengths between the layers were measured. The results are shown in Table 2.

TABLE 1

| | Adhesive (composition) layer (III) | | | | | | | | | |
|---|---|---|---|---|---|---|---|---|---|---|
| | Polyolefin raw material (A) | | | | | | Chlorinated Polyolefin | | Non-modified polyolefin | |
| | α-Olefin as main Component | | Comonomer | | Crystal- | | | Chlorine Content | Amount | |
| Example No. | Type | Content (mole %) | Type | Content (mole %) | linity (%) | [η] (dl/g) | $\overline{Mw}/\overline{Mn}$ | Content (wt. %) | Amount (%) | Type | Amount (%) |
| 1 | Propylene | 70 | 1-Butene | 30 | 25 | 1.7 | 4.9 | 25 | 100 | — | 0 |
| 2 | Propylene | 70 | 1-Butene | 30 | 25 | 1.7 | 4.9 | 25 | 80 | PP | 20 |
| 3 | Ethylene | 80 | Propylene | 20 | 15 | 1.3 | 3.2 | 5 | 100 | — | 0 |
| 4 | Ethylene | 80 | Propylene | 20 | 15 | 1.3 | 3.2 | 20 | 100 | — | 0 |
| 5 | Propylene | 70 | 1-Butene | 30 | 25 | 1.7 | 4.9 | 7 | 100 | — | 0 |

TABLE 1-continued

| | | | | | | | | | | | |
|---|---|---|---|---|---|---|---|---|---|---|---|
| 6 | Propylene | 70 | 1-Butene | 30 | 25 | 1.7 | 4.9 | 39 | 100 | — | 0 |
| 7 | Propylene | 55 | Ethylene | 45 | 5 | 1.9 | 4.0 | 21 | 100 | — | 0 |
| 8 | Propylene | 100 | — | — | 30 | 55 | 2.1 | 8.8 | 20 | 100 | — | 0 |
| 9 | Propylene | 75 | 4-Methyl-1-pentene | 25 | 14 | 2.0 | 4.5 | 20 | 100 | — | 0 |
| 10 | Propylene | 70 | 1-Butene | 30 | 24 | 0.6 | 5.1 | 20 | 100 | — | 0 |
| 11 | Propylene | 70 | 1-Butene | 30 | 25 | 7.2 | 5.6 | 21 | 100 | — | 0 |
| 12 | Propylene | 70 | 1-Butene | 30 | 25 | 1.7 | 4.9 | 25 | 100 | — | 0 |

| Example No. | Type of base material layer (I) (inner layer) | Type of base material layer (II) (outer layer) | Peeling strength between (I) and (III) (g/15 mm) Peeling temperature 23° C. | 80° C. | Peeling strength between (II) and (III) (g/15 mm) Peeling temperature 23° C. | 80° C. |
|---|---|---|---|---|---|---|
| 1 | PVDC *1 | PP *2 | 1520 | 680 | Peeling was impossible. | Peeling was impossible. |
| 2 | Same as above | Same as above | 1050 | 590 | Same as above | Same as above |
| 3 | Same as above | Same as above | 560 | 50 | 1060 | 200 |
| 4 | Same as above | Same as above | 1420 | 80 | 1000 | 120 |
| 5 | Same as above | Same as above | 550 | 70 | Peeling was impossible. | Peeling was impossible |
| 6 | Same as above | Same as above | 1480 | 170 | 730 | 120 |
| 7 | Same as above | Same as above | 1360 | 20 | Peeling was impossible. | Peeling was impossible. |
| 8 | Same as above | Same as above | 210 | 30 | Same as above | Same as above |
| 9 | Same as above | Same as above | 1250 | 420 | Same as above | Same as above |
| 10 | Same as above | Same as above | 510 | 60 | Same as above | 820 |
| 11 | Same as above | Same as above | Laminate formation was impossible. | | | |
| 12 | PVC *3 | Same as above | 1020 | 590 | Peeling was impossible. | Peeling was impossible |

*1 A polyvinylidene chloride, manufactured by Dow Chemical Co.
*2 A polypropylene, manufactured by Mitsui Petrochemical Industries, Ltd.
*3 A polyvinyl chloride, manufactured by Nippon Zeon Co., Ltd.

TABLE 2

Adhesive (composition) layer (III)

| | Polyolefin raw material (A) | | | | | | Chlorinated polyolefin | | Non-modified polyolefin | |
|---|---|---|---|---|---|---|---|---|---|---|
| | α-Olefin as a main component | | Comonomer | | Crystal-linity | [η] | | Chlorine Content | Amount | | Amount |
| Example No. | Type | Content (mole %) | Type | Content (mole %) | (%) | (dl/g) | Mw/Mn | (wt. %) | (%) | Type | (%) |
| 13 | Propylene | 70 | 1-Butene | 30 | 23 | 1.3 | 4.7 | 25 | 100*4 | — | 0 |
| 14 | Propylene | 70 | 1-Butene | 30 | 25 | 1.7 | 4.9 | 25 | 80 | PP MAH-PP*5 | 15 5 |
| 15 | Propylene | 70 | 1-Butene | 30 | 25 | 1.7 | 4.9 | 25 | 100 | — | 0 |
| 16 | Propylene | 70 | 1-Butene | 30 | 25 | 1.7 | 4.9 | 25 | 100 | — | 0 |
| 17 | Propylene | 70 | 1-Butene | 30 | 25 | 1.7 | 4.9 | 25 | 100 | — | 0 |
| 18 | Propylene | 70 | 1-Butene | 30 | 25 | 1.7 | 4.9 | 25 | 100 | — | 0 |

| Example No. | Type of base material layer (I) (inner layer) | Type of base material layer (II) (outer layer) | Peeling strength between (I) and (III) (g/15 mm) Peeling temperature 23° C. | 80° C. | Peeling strength between (II) and (III) (g/15 mm) Peeling temperature 23° C. | 80° C. |
|---|---|---|---|---|---|---|
| 13 | PVC *3 | EVOH *6 | 1530 | 690 | 1520 | 490 |
| 14 | Same as above | Same as above | 1420 | 650 | 1300 | 570 |
| 15 | HIPS *7 | PP | 1060 | 630 | Peeling was impossible. | Peeling was impossible. |
| 16 | PETG *8 | Same as above | 1150 | 510 | Same as above | Same as above |
| 17 | PC *9 | Same as above | 1370 | 560 | Same as above | Same as above |
| 18 | PPO *10 | Same as above | 990 | 490 | Same as above | Same as above |

*4 A chlorination product of a maleic anhydride-grafted propylene/1-butene copolymer (maleic anhydride content: 0.3% by weight)
*5 A maleic anhydride-grafted polypropylene (maleic anhydride content: 3.5% by weight)
*6 An ethylene-vinyl alcohol copolymer (EVAL ®), manufactured by KURARAY CO., LTD.
*7 High impact polystyrene, manufactured by Mitsui Toatsu Chemicals, Inc.
*8 Polyester copolymer, manufactured by Eastman CO.
*9 Polycarbonate, manufactured by GE Co.
*10 Polyphenylene oxide, manufactured by Dow Chemical Co.

Industrial Applicability

As appreciated from the foregoing, the chlorinated polyolefin type polymer of the present invention is suitable for use as an adhesive which can exhibit excellent adhesion characteristics in high temperature atmospheres in lamination of a chlorine-containing polymer or an aromatic polymer and a polyolefin.

I claim:

1. A chlorinated polyolefin characterized by being produced by chlorinating an olefin polymer having the following characteristics (a), (b), (c) and (d):
   (a) comprising propylene units and units of α-olefin having 4 to 6 carbon atoms,
   (b) comprising said propylene units and said αolefin units in amounts of 60 to 80 mole% and 40 to 20 mole%, respectively, based on the total amount of the propylene units and the α-olefin units,
   (c) having a crystallinity of 10 to 50%, and
   (d) having an intrinsic viscosity of 0.8 to 6.0 dl/g, and further characterized by (e) having a chlorine content of 15 to 35% by weight.

2. A chlorinated polyolefin according to claim 1, wherein the polyolefin type polymer is a propylene/1-butene copolymer consisting essentially of propylene units and 1-butene units.

3. An adhesive for chlorine-containing polymers or aromatic polymers, characterized by comprising, as an adhesive component, a chlorinated polyolefin which is produced by chlorinating an olefin polymer having the following characteristics (a), (b), (c) and (d):
(a) comprising propylene units and units of an α-olefin having 4 to 6 carbon atoms,
(b) comprising said propylene units and said α-olefin units in amounts of 60 to 80 mole% and 40 to 20 mole%, respectively, based on the total amount of the propylene units and the α-olefin units,
(c) having a crystallinity of 10 to 50%, and
(d) having an intrinsic viscosity of 0.8 to 6.0 dl/g,
and which
(e) has a chlorine content of 15 to 35% by weight.

4. An adhesive according to claim 3, wherein the polyolefin type polymer is a propylene/1-butene copolymer which consists essentially of propylene units and 1-butene units.

5. An adhesive according to claim 3, wherein the chlorine-containing polymer is a polyvinylidene chloride or a polyvinyl chloride.

6. An adhesive according to claim 3, wherein the aromatic polymer is a polystyrene, a polyester, a polycarbonate or a polyphenylene oxide.

7. A laminate comprising a polyolefin layer, an adhesive layer of a chlorinated polyolefin and a layer of a chlorine-containing polymer or an aromatic polymer in this order characterized in that the chlorinated polyolefin is produced by chlorinating an olefin polymer having the following characteristics (a), (b), (c) and (d):
(a) comprising propylene units and units of an α-olefin having 4 to 6 carbon atoms,
(b) comprising said propylene units and said α-olefin units in amounts of 60 to 80 mole% and 40 to 20 mole%, respectively, based on the total amount of the propylene units and the α-olefin units,
(c) having a crystallinity of 10 to 50%, and
(d) having an intrinsic viscosity of 0.8 to 6.0 dl/g,
and the chlorinated polyolefin further
(e) has a chlorine content of 15 to 35% by weight.

* * * * *